United States Patent
Kruglick

(10) Patent No.: US 9,220,043 B2
(45) Date of Patent: *Dec. 22, 2015

(54) DYNAMIC INTERNETWORK LOAD BALANCING

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/472,975

(22) Filed: Aug. 29, 2014

(65) Prior Publication Data

US 2014/0369316 A1 Dec. 18, 2014

Related U.S. Application Data

(63) Continuation of application No. 12/999,513, filed as application No. PCT/US2010/047954 on Sep. 7, 2010, now Pat. No. 8,830,957.

(51) Int. Cl.
*H04W 4/00* (2009.01)
*H04W 36/04* (2009.01)
*H04W 36/16* (2009.01)

(52) U.S. Cl.
CPC .............. *H04W 36/04* (2013.01); *H04W 36/16* (2013.01)

(58) Field of Classification Search
None
See application file for complete search history.

(56) References Cited

U.S. PATENT DOCUMENTS

| 6,944,144 | B2 * | 9/2005 | Guo et al. ................ 370/332 |
| 6,982,949 | B2 * | 1/2006 | Guo et al. ................ 370/210 |
| 7,363,037 | B2 | 4/2008 | Huang et al. |
| 7,489,659 | B2 | 2/2009 | Siorpaes et al. |
| 7,574,212 | B2 | 8/2009 | McConnell et al. |
| 7,653,392 | B2 | 1/2010 | Ovadia et al. |
| 7,826,426 | B1 | 11/2010 | Bharghavan et al. |
| 8,027,679 | B2 | 9/2011 | Prasad |
| 2002/0187780 | A1 * | 12/2002 | Souissi ................ 455/426 |
| 2003/0193910 | A1 | 10/2003 | Shoaib et al. |
| 2005/0272428 | A1 | 12/2005 | Tanabe et al. |
| 2005/0276240 | A1 | 12/2005 | Gupta et al. |
| 2006/0039327 | A1 | 2/2006 | Samuel et al. |
| 2007/0008929 | A1 | 1/2007 | Lee et al. |
| 2007/0253339 | A1 | 11/2007 | Ovadia et al. |

(Continued)

FOREIGN PATENT DOCUMENTS

| CN | 101321385 A | 12/2007 |
| CN | 101600239 A | 12/2009 |

(Continued)

OTHER PUBLICATIONS

Wiethoelter et al. "Selecting Vertical Handover Candidates in IEEE 802.11 Mesh Networks." Symposium Conference Jun. 15-19, 2009 [Hereafter] Wiethoelter.*

(Continued)

*Primary Examiner* — Gregory Sefcheck
*Assistant Examiner* — Jael Ulysse
(74) *Attorney, Agent, or Firm* — Brundidge & Stanger, P.C.

(57) ABSTRACT

Examples are disclosed for executing vertical handovers of wireless devices configured to couple with heterogeneous wireless networks. In some examples, wireless devices on separate heterogeneous networks may be swapped between the heterogeneous networks.

24 Claims, 7 Drawing Sheets

(56) References Cited

U.S. PATENT DOCUMENTS

| | | | |
|---|---|---|---|
| 2007/0293222 A1* | 12/2007 | Vikberg et al. | 455/436 |
| 2008/0031188 A1 | 2/2008 | Magnusson et al. | |
| 2008/0064401 A1 | 3/2008 | Forssell et al. | |
| 2008/0076430 A1* | 3/2008 | Olson | 455/440 |
| 2008/0085712 A1 | 4/2008 | Han | |
| 2008/0117866 A1* | 5/2008 | Claussen et al. | 370/329 |
| 2008/0151845 A1 | 6/2008 | Jaakkola et al. | |
| 2008/0240052 A1 | 10/2008 | Gupta et al. | |
| 2008/0240091 A1 | 10/2008 | Kesavan et al. | |
| 2009/0285176 A1 | 11/2009 | Zheng et al. | |
| 2009/0323632 A1 | 12/2009 | Nix | |
| 2010/0002651 A1 | 1/2010 | Hofmann | |
| 2010/0014482 A1* | 1/2010 | Matsumoto et al. | 370/331 |
| 2010/0128696 A1 | 5/2010 | Fantini et al. | |
| 2010/0136978 A1 | 6/2010 | Cho et al. | |
| 2010/0197309 A1* | 8/2010 | Fang et al. | 455/436 |
| 2010/0260146 A1* | 10/2010 | Lu | 370/331 |
| 2010/0304737 A1 | 12/2010 | Jain et al. | |
| 2011/0026503 A1 | 2/2011 | Mueck et al. | |
| 2011/0096753 A1 | 4/2011 | Abdel-Kader et al. | |
| 2011/0206012 A1 | 8/2011 | Youn et al. | |
| 2012/0163344 A1 | 6/2012 | Bakthavathsalu et al. | |
| 2012/0276901 A1 | 11/2012 | Kruglick | |

FOREIGN PATENT DOCUMENTS

| | | |
|---|---|---|
| KR | 100578305 B1 | 5/2006 |
| WO | 2007129479 | 11/2007 |

OTHER PUBLICATIONS

Steven Wiethoelter and Adam Wolisz, Selecting Vertical Handover Candidates in IEEE 802.11 Mesh Networks; 2009; IEEE Symposium Conference Jun. 15-19, 2009; Telecommunication Networks Group, pp. 1-7.

Meriem Kassar and Brigitte Kervella and Guy Pujolle, An Overview of Vertical Handover Decision Strategies in Heterogeneous Wireless Networks; Jan. 31, 2008; Science Direct, pp. 2607-2620.

Madalina Fiterau and Olga Ormond and Gabriel-Mira Muntean, Performance of Handover for Multiple Users in Heterogeneous Wireless Networks; 2009; IEEE 34th Conference on Local Computer Networks Oct. 20-23, 2009; pp. 257-260.

Lee et al., Vertical Handoff Decision Algorithms for Providing Optimized Performance in Heterogeneous Wireless Networks, IEEE Transactions on Vehicular Technology, vol. 58, No. 2, Feb. 2009, pp. 865-881.

Dimitriou et al., Vertical Handover between Wireless Standards, Proceedings of IEEE Conference on Communications (ICC), May 19-23, 2008.

Taha et al., Vertical Handoffs as a Radio Resource Management Tool, Computer Communications, Elsevier Science Publishers, vol. 31, Issue 5, Mar. 2008, pp. 950-961.

R. Ferrus et al., Vertical Handover Support in Coordinated Heterogeneous Radio Access Networks, Proceedings 14th 1st Mobile and Wireless Communications Summit, Dresden, Germany (Jun. 2005).

Y.C. Chen et al., Advanced seamless vertical handoff architecture for WiMax and WiFi heterogenous networks with QoS guarantees, Computer Communications, vol. 32 (2009), pp. 281-293.

S. T. Cheng et al., 1Pv6-based dynamic coordinated call admission control mechanism over integrated wireless networks, IEEE Journal of Selected Areas in Communications 23, No. 11 (2005), pp. 2093-2103.

International Search Report for International Application No. PCT/US2010/047954, mailed on Oct. 29, 2010.

* cited by examiner

Multiuser Table 300

| Row | NW | NW Info. | Core NW | Core Info. | W.D. | User Info. | Trigger Event? | Swap Can.? | Swap NW |
|---|---|---|---|---|---|---|---|---|---|
| 310 | 120 | Buffer - 5Mbs | 110 | Strm. Video | 122 | Sec. 128-bit | No | No | n/a |
| 320 | 120 | Buffer - 5Mbs | 110 | Strm. Video | 124 | Sec. 32-bit | Yes | Yes | 130 |
| 330 | 120 | Buffer - 5Mbs | 110 | Strm. Video | 126 | Min. 1Mbs | No | No | n/a |
| 340 | 120 | Buffer - 5Mbs | 110 | Strm. Video | 128 | Min. 0.5Mbs | No | No | n/a |
| 350 | 130 | Buffer - 1Mbs | 110 | Strm. Video | 132 | Loss < 0.05% | Yes | Yes | 120 |
| 360 | 130 | Buffer - 1Mbs | 110 | Strm. Video | 134 | Sec. 64-bit | No | No | n/a |
| 370 | 130 | Buffer - 1Mbs | 110 | Strm. Video | 136 | Delay < 25ms | No | No | n/a |
| 380 | 130 | Buffer - 1Mbs | 110 | Strm. Video | 138 | Strm. Video | No | No | n/a |

FIG. 3

600 A computer program product.

602 A signal bearing medium.

604 instructions for executing vertical handovers of wireless devices configured to couple with heterogenous wireless networks, which, when executed by logic, cause the logic to:

receive an indication of one or more triggering events associated with vertical handovers of wireless devices;

responsive to the received indication, coordinate a first vertical handover for a first wireless device with a second vertical handover for a second wireless device, the first wireless device coupled to a first wireless network and the second wireless device coupled to a second wireless network; or execute the first vertical handover and the second vertical handover based at least in part on vertical handover information associated with a plurality of wireless devices.

| 606 a computer-readable medium. | 608 a recordable medium. | 610 a communications medium. |

FIG. 6

DYNAMIC INTERNETWORK LOAD BALANCING

CROSS-REFERENCE TO RELATED APPLICATIONS

This Application is a continuation under 35 U.S.C. §120 of U.S. patent application Ser. No. 12/999,513 filed on Dec. 16, 2010, now U.S. Pat. No. 8,830,957, which is a National Stage Application under 35 U.S.C. §371 of International Application No. PCT/US2010/47954, filed on Sep. 7, 2010.

BACKGROUND

Unless otherwise indicated herein, the approaches described in this section are not prior art to the claims in this application and are not admitted to be prior art by inclusion in this section.

Complex wireless communication systems may be deployed such that coverage areas for different types of wireless networks ("heterogeneous wireless networks") included in the wireless communication systems may overlay, overlap or coexist. Thus, a wireless device with a capability to couple to more than one type of wireless network may have an opportunity to choose the type of wireless network to which the wireless device may couple or connect. However, a given wireless network may have certain bandwidth and user count capabilities and also may need to maintain an adequate buffer for sudden bursts of demand or sudden correlation in data flow among wireless devices already coupled to the given wireless network.

Typically, admission policies for a wireless network may be based on the observed loading and radio management of a single node or access point via which wireless devices may couple to the wireless network. Wireless communication systems have been proposed that include coordinated wireless device access between heterogeneous wireless networks. A coordinated wireless device access process between heterogeneous wireless networks may help shift a single wireless device from a first wireless network to a second wireless network based on acquired or shared knowledge of the wireless device and access points or nodes associated with each respective wireless network. In some examples, a wireless device access that is coordinated between heterogeneous wireless networks based on acquired or shared knowledge may be referred to as a vertical handover of the wireless device.

SUMMARY

The present disclosure describes example methods for implementing vertical handovers of wireless devices configured to couple with heterogeneous wireless networks. The methods may include receiving an indication of one or more triggering events associated with vertical handovers of wireless devices. Also, responsive to the received indication, a first vertical handover for a first wireless device may be coordinated with a second vertical handover for a second wireless device. The first wireless device may be coupled to a first wireless network and the second wireless device may be coupled to a second wireless network. The first vertical handover and the second vertical handover may then be executed based at least upon vertical handover information associated with a plurality of wireless devices.

The present disclosure also describes example devices for vertical handovers of wireless devices configured to couple with heterogeneous wireless networks. The example devices may have a channel manager that includes logic. The logic may be configured to receive an indication of one or more triggering events associated with vertical handovers of wireless devices. Responsive to the received indication, the logic may be configured to coordinate a first vertical handover for a first wireless device with a second vertical handover for a second wireless device. The first wireless device may be coupled to a first wireless network and the second wireless device may be coupled to a second wireless network. In some examples, the logic may also be configured to execute the first vertical handover and the second vertical handover based at least upon vertical handover information associated with a plurality of wireless devices.

The present disclosure also describes example systems to execute vertical handovers of wireless devices configured to couple with heterogeneous wireless networks. The example systems may include a memory and a vertical handover manager coupled to the memory. The vertical handover manager may have logic configured to receive an indication of one or more triggering events associated with vertical handovers of wireless devices. Responsive to the received indication, the logic may be configured to coordinate a first vertical handover for a first wireless device with a second vertical handover for a second wireless device. The first wireless device may be coupled to a first wireless network and the second wireless device may be coupled to a second wireless network. In some examples, the logic may also be figured to execute the first vertical handover and the second vertical handover based at least upon vertical handover information associated with a plurality of wireless devices.

The present disclosure also describes example computer program products. In some examples, the computer program products may include a signal bearing medium having instructions for executing vertical handovers of wireless devices configured to couple with heterogeneous wireless networks. The instructions, which, when executed by logic may cause the logic to receive an indication of one or more triggering events associated with vertical handovers of wireless devices. Responsive to the received indication, the instructions may also cause the logic to coordinate a first vertical handover for a first wireless device with a second vertical handover for a second wireless device. The first wireless device may be coupled to a first wireless network and the second wireless device may be coupled to a second wireless network. The instructions may also cause the logic to execute the first vertical handover and the second vertical handover based at least in part on vertical handover information associated with a plurality of wireless devices.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3 illustrates an example multiuser table to coordinate vertical handovers;

FIG. 6 illustrates a block diagram of an example computer program product; and

DETAILED DESCRIPTION

Figure 1:
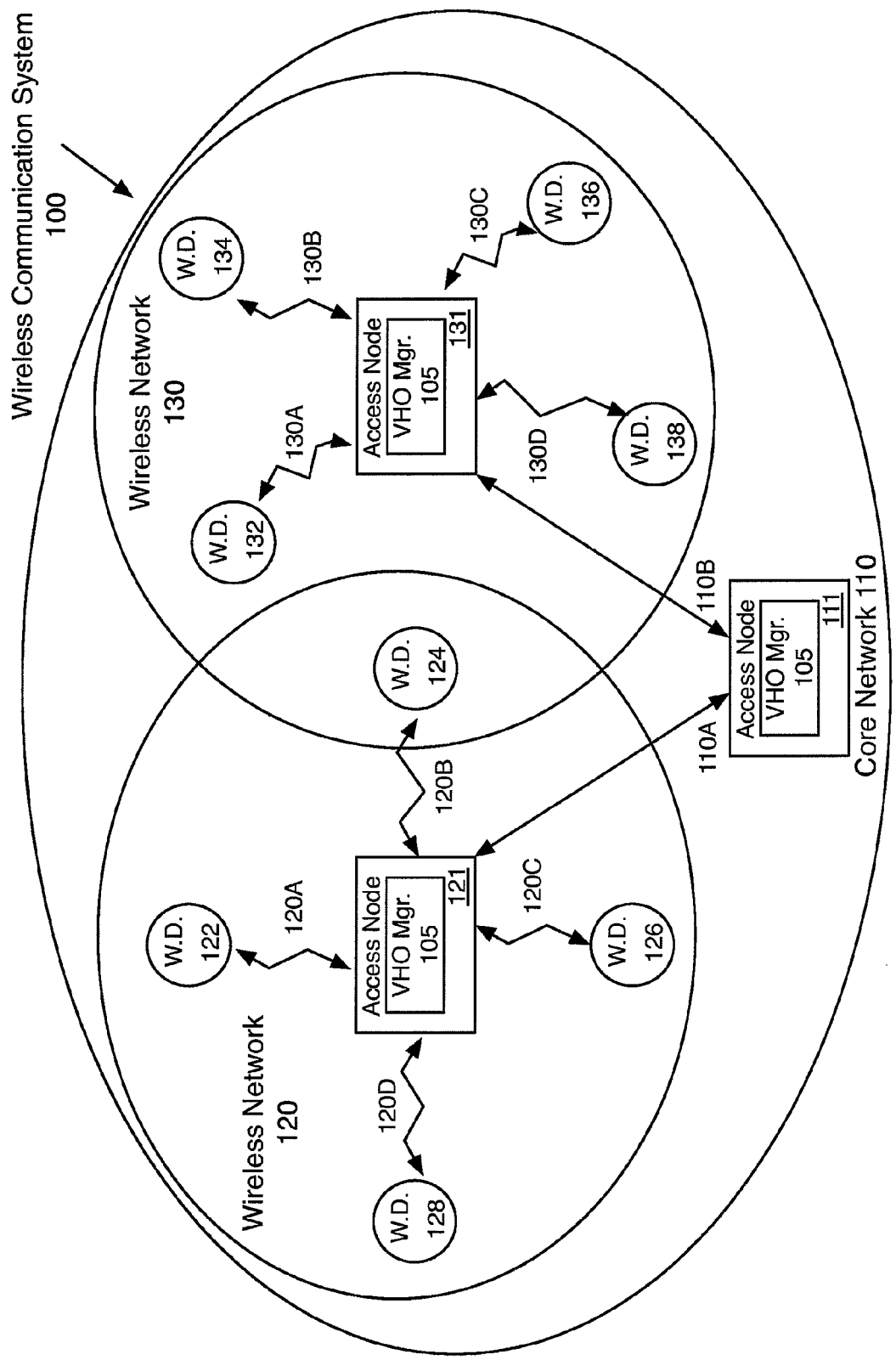
FIG. 1 illustrates an example wireless communication system.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to vertical handovers of wireless devices configured to couple with heterogeneous wireless networks.

As contemplated in the present disclosure, a vertical handover of a single wireless device may be based on acquired or shared knowledge between heterogeneous wireless networks. However, proposed wireless communication systems that include overlapping or coexistent heterogeneous wireless networks may only instigate or execute a vertical handover on a single wireless device basis. The single wireless device basis may be problematic in that a busy or congested wireless communication system, for example, may have wireless devices on multiple different types of wireless networks. In some examples, at least a portion of the wireless devices may be better off switching to other network connections with another type of wireless networks (e.g., better throughput, signal strength, quality of service, etc.). But since the wireless communication system is congested or busy, admission of new wireless devices to other wireless networks may prevent a single wireless device switching its network connection until after one or more wireless devices depart or decouple from these other types of wireless networks.

In some examples, methods are implemented for vertical handovers of wireless devices configured to couple with heterogeneous wireless networks. The methods may include receiving an indication of one or more triggering events associated with vertical handover of wireless devices. Also, responsive to the received indication, a first vertical handover for a first wireless device may be coordinated with a second vertical handover for a second wireless device. The first wireless device may be coupled to a first wireless network and the second wireless device may be coupled to a second wireless network. The first vertical handover and the second vertical handover may then be executed based at least upon vertical handover information associated with a plurality of wireless devices.

FIG. 1 illustrates an example wireless communication system 100. As shown in FIG. 1, wireless communication system 100 includes heterogeneous wireless networks 120 and 130 coupled to core network 110. As depicted in FIG. 1, wireless networks 120 and 130 may be separately coupled to core network 110 through access node 111. Wireless networks 120 and 130 may be coupled via network connections 110A and 120B, respectively. Also, wireless network 110 is shown in FIG. 1 as including access node 121 coupled to wireless devices 122, 124, 126 and 128 via network connections 120A, 120B, 120C and 120D, respectively. Further, wireless network 130 is shown in FIG. 1 as including access node 131 coupled to wireless devices 132, 134, 136 and 128 via network connections 130A, 120B, 120C and 120D, respectfully. In some examples, as depicted in FIG. 1, access nodes 111, 121 or 131 may separately include a vertical handover (VHO) manager 105.

In some examples, wireless networks 120 and 130 are heterogeneous based on each network operating in accordance with different types of wireless network technologies described in various types of industry standards. One type of wireless network technology may be described in an industry standard known as Institute of Electrical and Electronics Engineers (IEEE) 802.11-2007 and may be referred to as "WiFi". A WiFi type of wireless network may also be referred to as a wireless local area network (WLAN). Another type of wireless network technology may be described in an industry standard known as IEEE 802.16-2009 and may be referred to as "WiMax". Another type of wireless network technology may be described in one or more industry standards associated with the $3^{rd}$ Generation Partnership Project such as GSM, GPRS, EDGE, W-CDMA, HSPA, LTE or LTE-Advanced and may be referred to as "3GPP". Yet another type of wireless network technology may be described in one or one or more industry standards associated with the 3rd Generation Partnership Project 2 such as CDMA-2000, EV-DO, EV-DO Rev. A or EV-DO Rev. B and may be referred to as "3GPP2". WiMax, 3GPP or 3GPP3 types of wireless networks may also be referred to as wireless wide area networks (WLANs). Although this disclosure is not limited to only the above-mentioned standards and types of wireless networks.

As mentioned above, core network 110 may be separately coupled through access node 111 to wireless networks 120 and 130 via network connections 110A and 110B, respectively. Core network 110 may operate in compliance with one or more industry standards. For example, common core network 110 may operate in compliance with the one or more industry standards associated with 3GPP, 3GPP2, IEEE 802.11-2007, or IEEE 802.16-2009 or may operate in compliance with other industry standards such as IEEE 802.1. In some examples, network connections 110A and 110B may include wireless and/or wired network connections to couple to core network 110 and these network connections may also be configured to operate in compliance with standards associated with 3GPP, 3GPP2, IEEE 802.11-2007, IEEE 802.16-2009 or IEEE 802.1. Although this disclosure is not limited to only the above-mentioned standards.

As mentioned above and described more below, access nodes 111, 121 or 131 may include a VHO manager 105. In some examples, one or more of access nodes 111, 121 or 131 may include a VHO manager 105 having logic configured to receive an indication of one or more triggering events (e.g., wireless device movement, signal degradation, data usage change, etc.) associated with vertical handover of wireless devices (e.g., wireless devices 124 and 132). Responsive to the received indication, the logic may be configured to coordinate a first vertical handover for a first wireless device (e.g., wireless device 124) with a second vertical handover for a second wireless device (e.g., wireless device 132). The first wireless device may be coupled to a first wireless network (e.g., wireless network 120) and the second wireless device may be coupled to a second wireless network (e.g., wireless network 130). In some examples, the logic may also be figured to execute the first vertical handover and the second vertical handover based at least upon vertical handover information associated with a plurality of wireless devices (e.g., wireless devices 122, 124, 126, 128, 132, 134, 136, or 138).

In some examples, wireless devices 122, 124, 126, 128, 132, 134, 136 or 138 may be mobile or stationary wireless devices, e.g., a computer, laptop, netbook, e-book, tablet-PC, small-form factor portable (or mobile) electronic device such as a cell phone, smart phone, a personal data assistant (PDA), a personal media player device, a wireless web-watch device, a personal headset device, an application specific device, or a hybrid device that may include any of the above functions.

In some examples, access nodes 111, 121 or 131 may be of various types. For example, access nodes 121 or 131 may be access points for a wireless local area network (WLAN) or a wireless wide area network (WWAN). Also, access node 111 may be a wired or wireless access point for a large core or backbone network such as a metropolitan area network (MAN).

Figure 2:
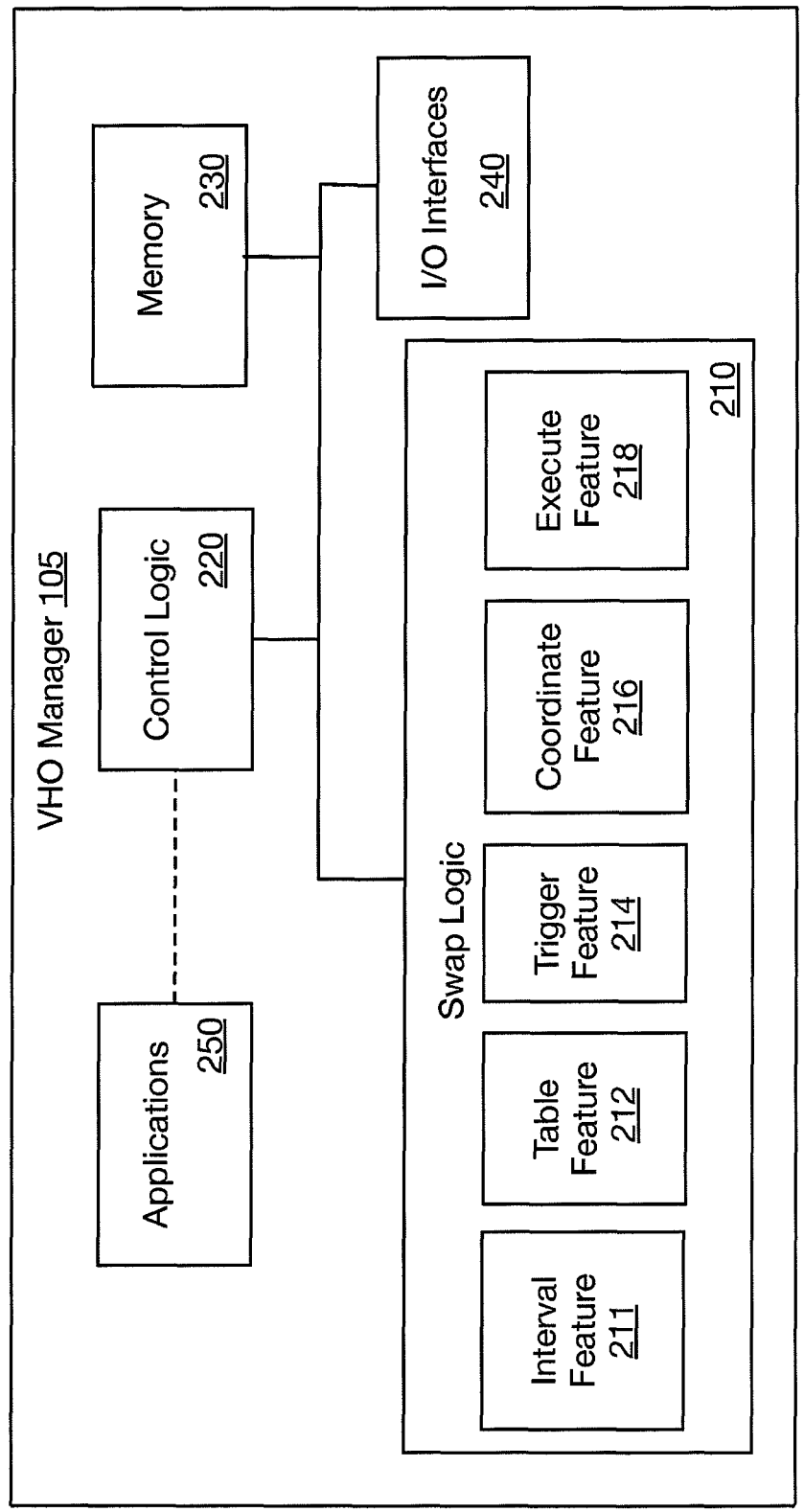
FIG. 2 illustrates a block diagram of an example architecture for a vertical handover manager.

FIG. 2 illustrates a block diagram of an example architecture for a vertical handover (VHO) manager 105. As described above for wireless communication system 100 in FIG. 1, access nodes 111, 121 or 131 may include a VHO manager 105. In some examples, VHO manager 105 includes features and/or logic configured or arranged for vertical handovers of wireless devices configured to couple with heterogeneous wireless networks (e.g., wireless networks 120 and 130).

The example VHO manager 105 of FIG. 2, includes swap logic 210, control logic 220, memory 230, input/output (I/O) interfaces 240 and optionally one or more applications 250. As illustrated in FIG. 2, swap logic 210 is coupled to control logic 220, memory 230 and I/O interfaces 240. Also illustrated in FIG. 2, the optional applications 250 are arranged in cooperation with control logic 220. Swap logic 210 may further include one or more of an interval feature 211, a table feature 212, a trigger feature 214, a coordinate feature 216 and a execute feature 218, or any reasonable combination thereof.

In some examples, the elements portrayed in FIG. 2's block diagram are configured to support or enable VHO manager 105 as described in this disclosure. A given VHO manager 105 may include some, all or more elements than those depicted in FIG. 2. For example, swap logic 210 and control logic 220 may separately or collectively represent a wide variety of logic device(s) to implement the features of VHO manager 105. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, swap logic 210 includes one or more of an interval feature 211, a table feature 212, a trigger feature 214, a coordinate feature 216 or a execute feature 218. Swap logic 210 may be configured to use one or more of these features to perform operations. As described in more detail below, example operations may include coordinating and executing vertical handovers of wireless devices configured to couple to heterogeneous wireless networks (e.g., wireless networks 120 and 130).

In some examples, control logic 220 may be configured to control the overall operation of VHO manager 105. As mentioned above, control logic 220 may represent any of a wide variety of logic device(s) configured to operate in conjunction with executable content or instructions to implement the control of VHO manager 105. In some alternate examples, the features and functionality of control logic 220 may be implemented within swap logic 210.

According to some examples, memory 230 is arranged to store executable content or instructions. The executable content or instructions may be used by control logic 220 and/or swap logic 210 to implement or activate features or elements of VHO manager 105. As described more below, memory 230 may also be arranged to temporarily maintain vertical handover information (e.g., in a multiuser table). The vertical handover information may be associated with a plurality of wireless devices coupled to heterogeneous wireless networks.

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via an internal communication medium or link between a VHO manager 105 and elements resident on or located with an access node via which VHO manager 105 may be resident on or co-located with. I/O interfaces 240 may include interfaces that operate according to various communication protocols to communicate over the internal communication link (e.g., Inter-Integrated Circuit (I²C), System Management Bus (SM Bus) or Serial Peripheral Interface Bus (SPI), etc.). I/O interfaces 240 may also provide an interface between VHO manager 105 and elements of an access node with which VHO manager 105 may be resident on or co-located with. For example, as mentioned above for FIG. 1, access node 111 may couple to access nodes 121 and 131 via network connections 110A and 110B, respectively. The I/O interfaces 240, for example, include an interface configured to operate according to various wireless and/or wired communication protocols to allow VHO manager(s) 105 to communicate over these network connections (e.g., IEEE, 802.1, IEEE 802.11, IEEE 802.16, GSM, GPRS, EDGE, W-CDMA, HSPA, LTE, CDMA-2000, EV-DO, etc.).

In some examples, VHO manager 105 includes one or more applications 250 to provide instructions to control logic 220 and/or swap logic 210. Instructions, for example, may include instructions for VHO manager 105 to implement or use one or more of an interval feature 211, a table feature 212, a trigger feature 214, a coordinate feature 216 or a execute feature 218.

FIG. 3 illustrates an example multiuser table 300 to coordinate vertical handovers. As shown in FIG. 3, multiuser table 300 includes rows 310-380. Rows 310-380 may include vertical handover information associated with wireless devices coupled to wireless networks 120 and 130 as shown in FIG. 1. This vertical handover information may include network, core and user information. The vertical handover information may also include an indication of whether a trigger event has occurred for a particular wireless device and whether that wireless device is a candidate for swap to another network. In some examples, one or more VHO manager 105s maintained at or collocated with access nodes 111, 121 or 131 may be configured to maintain at least a portion of multiuser table 300 (e.g., in a memory 230). The one or more VHO manager 105s may either coordinate vertical handover information such that a single VHO 105 in a single access node (e.g., access node 111) maintains the entire multiuser table 300 or multiple VHO manager 105's at multiple access nodes may separately maintain the entire multiuser table 300.

In some examples, network information may include an operation policy for the networks listed in multiuser table 300 (e.g., wireless network 120 or wireless network 130). The operation policy may indicate a minimum throughput buffer to accommodate potential spikes in network traffic. For example, multiuser table 300 indicates that wireless network 120 has a minimum buffer of 5 megabits per second (Mbs) and that wireless network 130 has a minimum buffer of 1 Mbs. Other types of operation policies may include, but are not limited to, types of services supported by a given network, security protocols supported, user capacity restrictions, spam restrictions, etc.

Although not shown in multiuser table 300, network information may include a radio resource management policy and a quality of service requirement for wireless network 120 and/or wireless network 130. An example radio resource management policy may be used to utilize limited radio spectrum resources and may include, but is not limited to, controlling parameters such as transmit power, channel allocation, modulation scheme, error coding scheme, etc. An example quality of service requirement may include, but is not limited to, packet loss limits, delay thresholds, minimum throughputs, traffic class priorities (e.g., data vs. streaming video), etc.

In some examples, core network information may include similar information to network information. As shown in FIG. 3, multiuser table 300 includes information for a quality of service requirement associated with a traffic class priority to indicate that streaming video is assigned the highest priority for core network 110. Although not shown in multiuser table 300, core network information may also include a common radio resource management policy and an operation policy for core network 110. The common radio resource management policy may manage radio spectrum resources that are commonly used by wireless networks coupled to core network 110. In some examples, the operation policy for core network 110 may include, but is not limited to, types of services supported, security protocols supported, user capacity restrictions (individual and/or aggregate), spam restrictions, etc.

In some examples, user information may include a user preference associated with the wireless device. For example, as shown in multiuser table 300 the user information for wireless device 122 indicates a user preference for 128-bit security. The 128-bit security user preference may indicate the need for a high level of encryption for data transmitted and/or received at wireless device 122. Other types of user preferences may include, but are not limited to, types of network preferred (e.g., WiMax vs. 3GPP), types of protocols preferred (e.g., EV-DO, LTE, WiFi), etc.

User information may also include one or more quality of service requirements for a given wireless device and one or more types of services being used by the given wireless device (e.g., streaming video/audio, location based services, etc.). The one or more quality of service requirements may include, but are not limited to, minimum bit-error-rates, minimum bandwidth requirements and maximum delay thresholds.

In some examples, as shown in FIG. 3, multiuser table 300 indicates various quality of service requirements for wireless devices. For example, wireless device 126 has a minimum bandwidth of 1 Mbs, wireless device 132 has a maximum pack loss of 0.05% and wireless device 136 has a maximum delay of 25 milliseconds (ms). Also as shown in FIG. 3, multiuser table 300 indicates that wireless device 138 may be using a streaming video type of service.

In some examples, multiuser table 300 may also indicate whether a trigger event has occurred. As described more below, a trigger event may be associated with the network, core or user information. The trigger event may result in a wireless device being selected as a possible candidate for a vertical handover to another network. Also, an indication of being a swap candidate as well as an indication of the swap to network may also be included in multiuser table 300. For example, rows 320 and 350 indicate that a trigger event has occurred for wireless devices 124 and 132 and both wireless devices are candidates for swaps to wireless networks 130 and 120, respectively.

Figure 4:
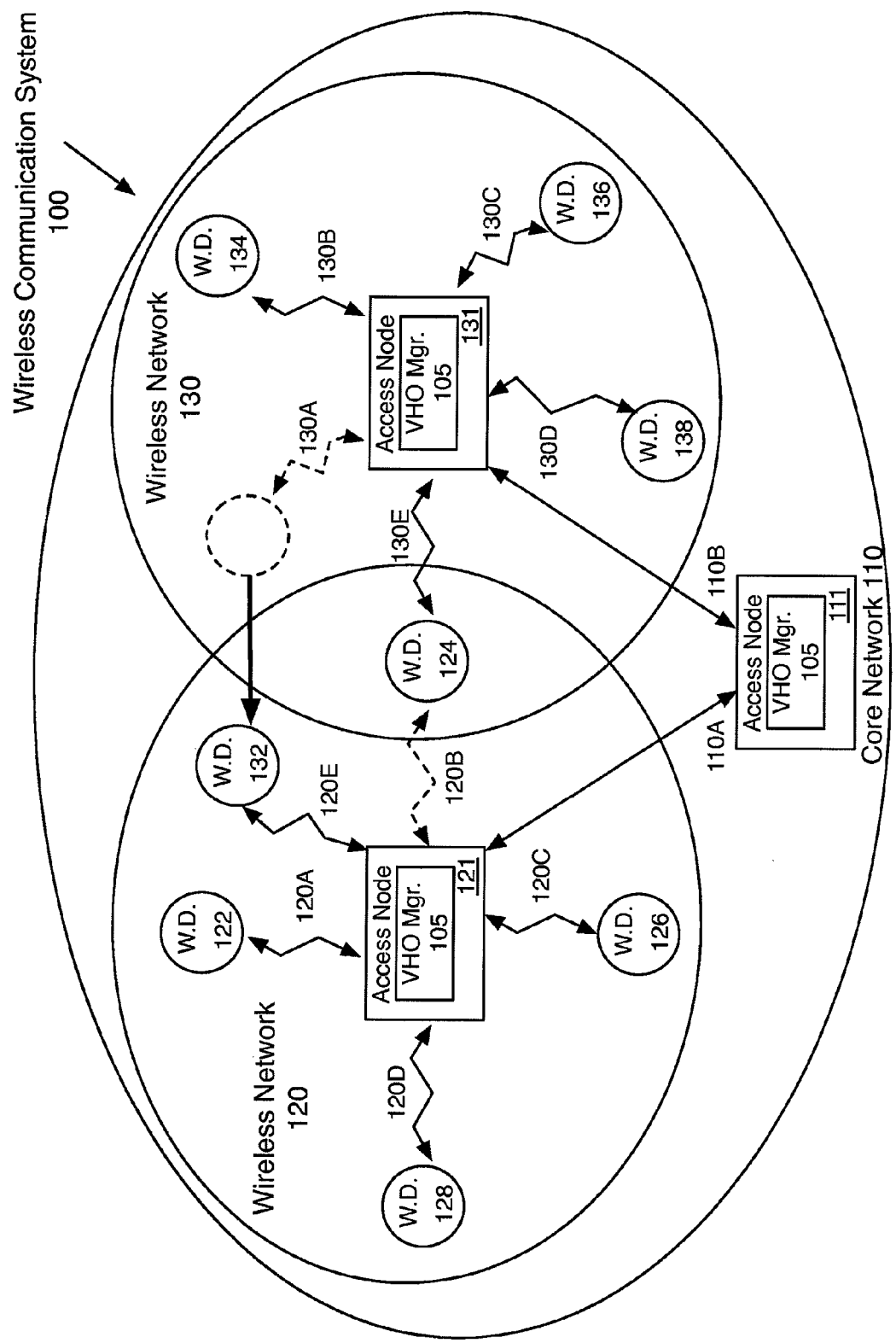
FIG. 4 illustrates a portion of the example wireless communication system following a coordinated vertical handovers of wireless devices.

FIG. 4 illustrates a portion of the example wireless communication system 100 following a coordinated vertical handover of wireless devices. As shown in FIG. 4, wireless device 132 has moved to a location that may physically place wireless device 132 closer to access node 121 of wireless network 120. In some examples, the movement of wireless device 132 may be considered as a triggering event, e.g., caused by unacceptably weak signal for wireless device 132 to couple to wireless network 130. Also, wireless device 124 may also cause a triggering event by changing a user preference that may negatively impact an operation policy for network 120, e.g., having a user preference of 32-bit security may reduce the capacity of the buffer for wireless network 120 to below 5 Mbs.

Multiuser table 300 at rows 320 and 350 may indicate information compiled by one or more VHO manager 105s at access nodes 111, 121 or 131. The information may indicate the above-mentioned trigger events for wireless devices 124 and 132. In some examples, as shown in multiuser table 300, wireless devices 124 and 132 are identified as swap candidates. Wireless device 124 is identified as a swap candidate to wireless network 130 and wireless device 132 is identified as a swap candidate to wireless network 120. The one or more VHO manager 105s may seek approval of the swap candidates. For example, wireless networks 120 and 130 may need to approve the candidates for the swap and send/forward that approval to the one or more VHO manager 105s.

In some examples, following the approval of the candidates by both wireless networks 120 and 130, confirmation of approval of both candidates may be distributed to wireless networks 120 and 130. A vertical handover may then be concurrently executed for both wireless device 124 and 132. As shown in FIG. 4, the concurrently executed vertical handover results in wireless device 124 being coupled to network 130 via network connection 130E and wireless device 132 being coupled to network 120 via network connection 120E.

Figure 5:
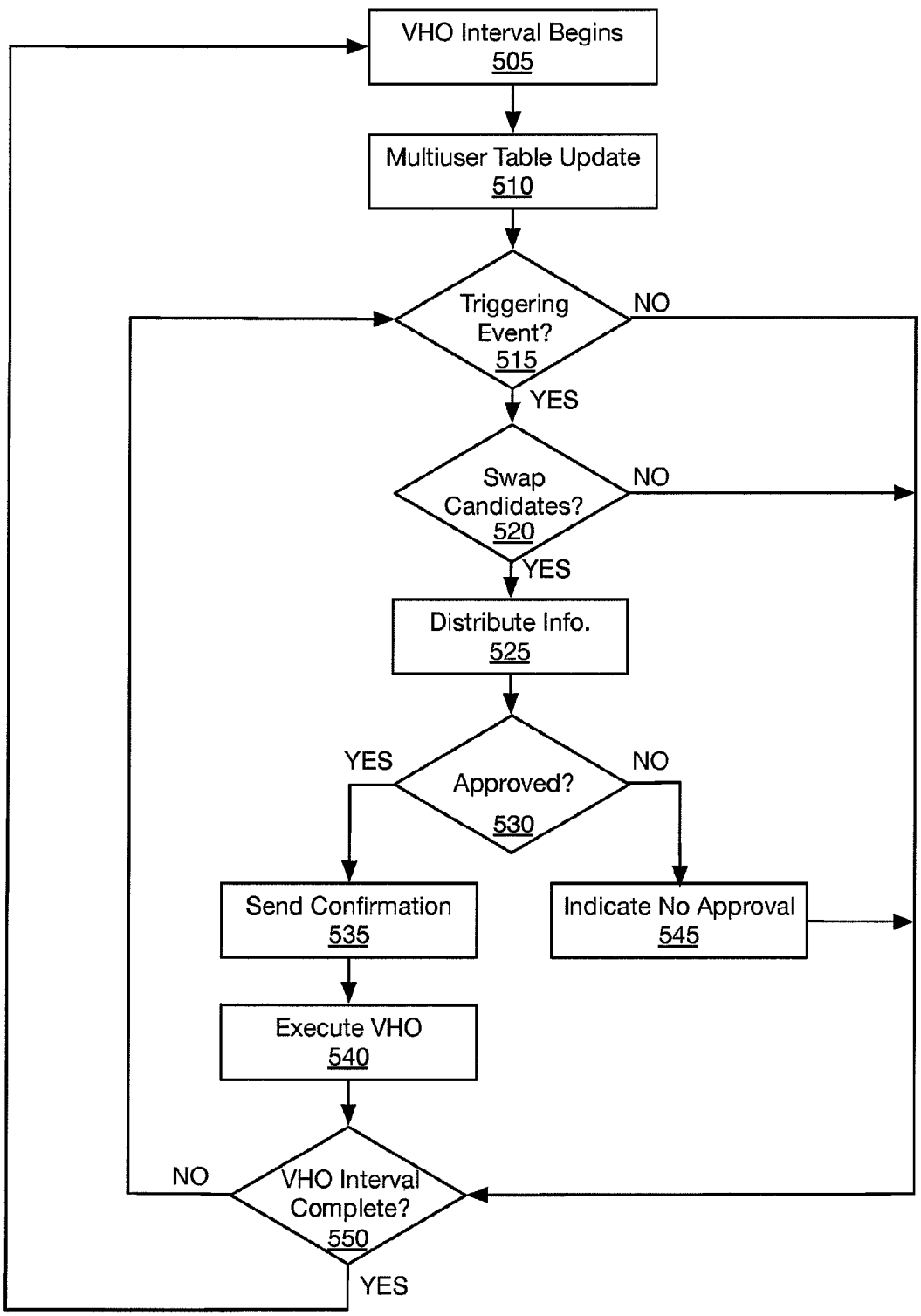
FIG. 5 illustrates a flow chart of example methods for vertical handovers of wireless devices configured to couple with heterogeneous wireless networks.

FIG. 5 illustrates a flow chart of example methods for vertical handovers of wireless devices configured to couple with heterogeneous wireless networks. In some examples, wireless communication system 100 as shown in FIG. 1, is used to illustrate example methods related to the flow chart depicted in FIG. 5. A VHO manager 105 as shown in FIG. 2 may also be used to illustrate the example methods. But the described methods are not limited to implementations on wireless communication system 100 as shown in FIG. 1 or to the VHO manager 105 shown in FIG. 2. The example methods may be implemented on other wireless communication systems having one or more of the elements depicted in FIG. 1 or 2.

Beginning at block 505 (VHO Interval Begins), VHO manager 105 may include logic and/or features configured to start a vertical handover (VHO) interval (e.g., via interval feature 211). In some examples, the VHO interval may be a time interval that may indicate to one or more VHO manager 105s maintained at or with access nodes 111, 121 or 131 to build, refresh or update vertical handover information maintained in a multiuser table (e.g., multiuser table 300) for wireless communication system 100. The time interval may be based on an amount of time that does not overburden the wireless communication system with excessive overhead yet provides timely information to dynamically adjust to changing network environments.

Continuing from block 505 to block 510 (Multiuser Table Update), VHO manager 105 may include logic and/or features configured to update the multiuser table (e.g., via table feature 212). In some examples, the multiuser table may be updated if network, core or user information changes (e.g., a wireless device moves or decouples from network 120 or network 130).

Proceeding from block 510 to decision block 515 (Triggering Event?), VHO manager 105 may include logic and/or features configured to determine whether possible changes in network, core or user information reached a level of one or more triggering events (e.g., via trigger feature 214). In some examples, the one or more triggering events may be associated with a quality of service threshold, a wireless device user preference, an operation or radio resource management policy for wireless networks 120 or 130, an operation policy for core network 110, or a common radio resource management policy for both wireless network 120 and wireless network 130. So, in these examples, processing may continue from decision block 515 to decision block 520 if a triggering event has occurred. Otherwise, if a triggering event has not occurred, processing moves to block 545.

At decision block 520 (Swap Candidates?), VHO manager 105 may include logic and/or features configured to determine whether swap candidates have been identified (e.g., via coordinate feature 216). In some examples, as mentioned above for multiuser table 300, wireless devices 124 and 132 may be identified as possible swap candidates. So according to these examples, swap candidates have been identified and processing may continue from decision block 520 to block 525. Otherwise, if swap candidates have not been identified, processing moves to decision block 550.

At block 525 (Distribute Info.), VHO manager 105 may include logic and/or features configured to distribute swap candidate information (e.g., via coordinate 216). In some examples, VHO manager 105s located at or with access nodes 111, 121 or 131 may each receive information to indicate which wireless devices are swap candidates. For example, multiuser table 300 indicates that wireless devices 124 and 132 are both swap candidates.

Proceeding from block 525 to decision block 530 (Approved?), VHO manager 105 may include logic and/or features configured to determine whether wireless networks 120 and 130 have approved the potential swap candidates (e.g., via coordinate feature 216). In some examples, wireless network 120 may indicate whether it will approve or accept a coupling of wireless device 132 to its network. Also, network 130 may indicate whether it will approve or accept a coupling of wireless device 124 to its network. So according to these examples, if both wireless networks 120 and 130 indicate that wireless devices 132 and 124 may couple to their respective networks, processing moves to block 535. Otherwise, if at least one of wireless networks 120 or 130 indicates no approval, processing moves to block 545.

At block 535 (Send Confirmation), VHO manager 105 may include logic and/or features configured to send or forward confirmation (e.g., via coordinate feature 216) that both wireless networks 120 and 130 have accepted the swap candidates. In some examples, the confirmation may indicate to access points 121 and 131 to prepare for vertical handovers of wireless devices 124 and 132. Also, a confirmation may be forwarded to wireless devices 132 and 124 to indicate a potential swapping of wireless networks.

Moving from block 535 to block 540 (Execute VHO), VHO manager 105 may include logic and/or features configured to execute a vertical handover (e.g., via execute feature 218) for wireless device 124 to couple to wireless network 130 and for wireless device 132 to couple to wireless network 120. In some examples, as described above for FIG. 4, the executed vertical handover for wireless device 124 may result in a new network connection 130E to couple wireless device 124 to wireless network 130. Also, the executed vertical handover for wireless device 132 may result in a new network connection 120E to couple wireless device 132 to wireless network 120. In some examples, VHO manager 105 may execute the vertical handover by forwarding an indication to wireless device 124 to swap network connection 120B with network connection 130E and forwarding an indication to wireless device 132 to swap network connection 130A with network connection 120E.

At block 545 (Indicate No Approval), VHO manager 105 may include logic and/or features configured to indicate that at least one of wireless network 120 or wireless network 130 did not approve of the swap candidates (e.g., via coordinate feature 216). In some examples, lack of approval by at least one of the networks may end efforts to coordinate a vertical handover for wireless devices 124 and 132. Unless, for example, another triggering event occurs within the VHO interval.

At decision block 550 (VHO Interval Complete?), VHO manager 105 may include logic and/or features configured to determine whether the VHO interval has expired. If the VHO interval has expired the process moves to block 505. Otherwise, if the VHO has not yet expired, the process moves to decision block 515.

FIG. 6 illustrates a block diagram of an example computer program product 600. In some examples, as shown in FIG. 6, computer program product 600 includes a signal bearing medium 602 that may also include instructions 604 for executing vertical handovers of wireless devices configured to couple with heterogeneous wireless networks. Instructions 604, which, when executed by logic (e.g., swap logic 210), may cause the logic to receive an indication of one or more triggering events associated with vertical handovers of wireless devices. Responsive to the received indication, the instructions 604 may also cause the logic to coordinate a first vertical handover for a first wireless device (e.g., wireless device 124) with a second vertical handover for a second wireless device (e.g., wireless device 132). The first wireless device may be coupled to a first wireless network (e.g., network 120) and the second wireless device may be coupled to a second wireless network (e.g., network 130). The instructions may also cause the logic to execute the first vertical handover and the second vertical handover based at least in part on vertical handover information associated with a plurality of wireless devices.

Also depicted in FIG. 6, in some examples, computer program product 600 may include one or more of a computer readable medium 606, a recordable medium 608 and a communications medium 610. The dotted boxes around these elements depict different types of mediums included within, but not limited to, signal bearing medium 602. These types of mediums may distribute instructions 604 to be executed by logic (e.g., swap logic 210). Computer readable medium 606 and recordable medium 608 may include, but are not limited to, a flexible disk, a hard disk drive (HDD), a Compact Disc (CD), a Digital Video Disk (DVD), a digital tape, a computer memory, etc. Communications medium 610 may include, but is not limited to, a digital and/or an analog communication medium (e.g., a fiber optic cable, a waveguide, a wired communication link, a wireless communication link, etc.).

Figure 7:
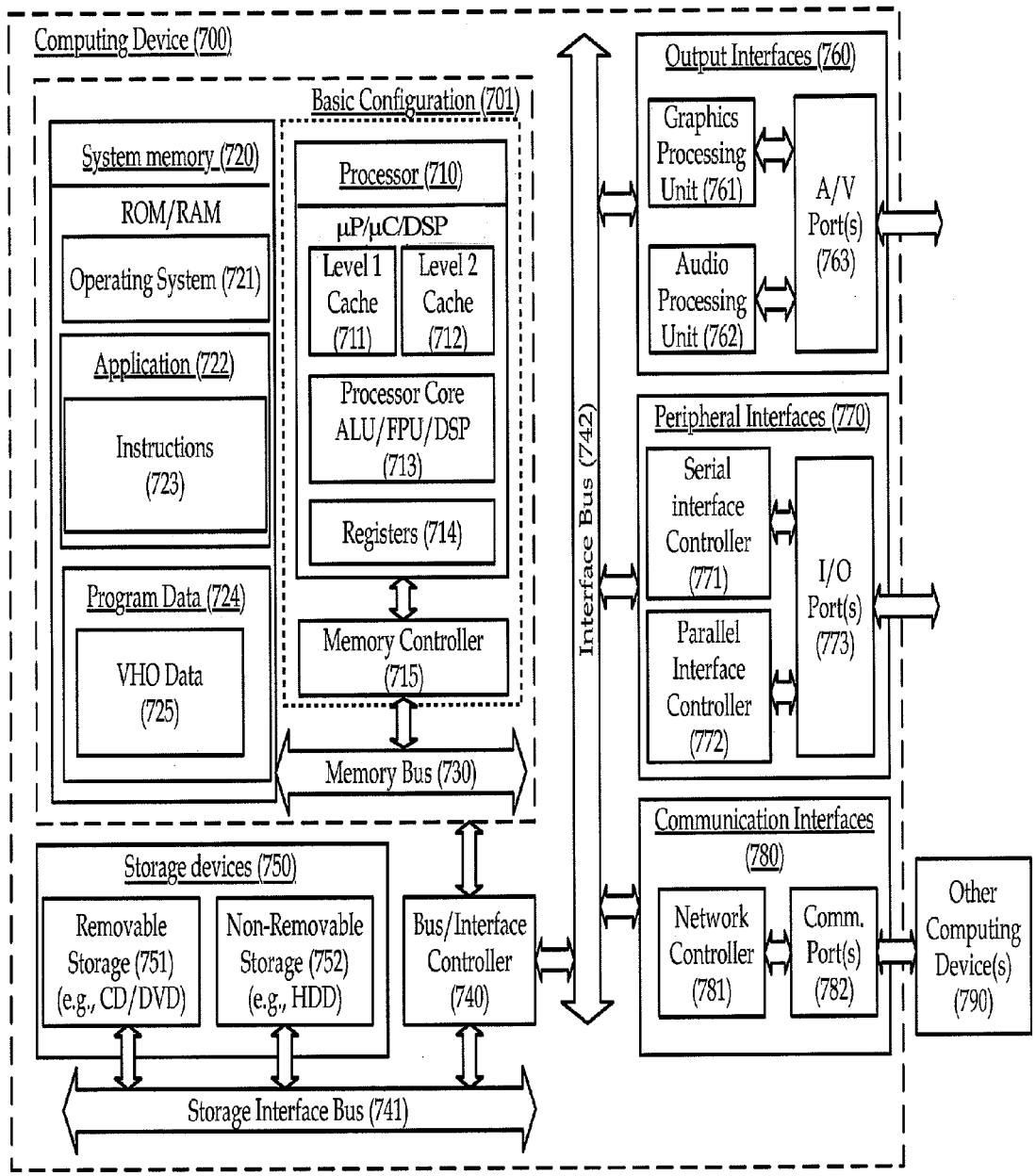
FIG. 7 illustrates an example computing device, arranged in accordance with the present disclosure.

FIG. 7 illustrates an example computing device 700. In some examples, VHO manager 105 depicted in FIGS. 1 and 2 may be implemented on computing device 700. In these examples, elements of computing device 700 may be arranged or configured for vertical handovers of wireless devices configured to couple with heterogeneous wireless networks. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (μP), a microcontroller (μC), a digital signal processor (DSP), or any combination thereof. Processor 710 can include one more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 includes instructions 723 that are arranged to perform the functions as described herein including the actions described with respect to VHO manager 105 architecture shown in FIG. 2 including the actions described with respect to the flow chart shown in FIG. 5. Program Data 724 includes VHO data 725 that is useful for implementing instructions 723 (e.g., coordinating and executing vertical handover of wireless devices). In some examples, application 722 can be arranged to operate with program data 724 on an operating system 721 such that implementations for vertical handovers of wireless devices configured to couple with heterogeneous wireless networks may be provided as described herein. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and non-volatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output interfaces 760 include a graphics processing unit 761 and an audio processing unit 762, which can be configured to communicate to various external devices such as a display or speakers via one or more A/V ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which can be arranged to facilitate communications with one or more other computing devices 790 over a network communication via one or more communication ports 782. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a small-form factor portable (or mobile) electronic device such as a cell phone, smart phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations or implemented in a workstation or a server configuration.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A method for vertical handovers, comprising:
    determining candidates, including a first wireless device and a second wireless device, for vertical handovers between wireless networks;
    executing a first vertical handover of the first wireless device and a second vertical handover of the second wireless device; and
    maintaining, by multiple vertical handover managers each collocated at a respective access node, a multiuser table including network information and user information of the wireless networks, and core information from a core network that is separately coupled to the wireless networks,
    wherein the executing the first vertical handover and the second vertical handover comprises:
    swapping a first network connection coupling the first wireless device to a first wireless network with a second network connection to couple the first wireless device to a second wireless network,
    swapping a third network connection coupling the second wireless device to the second wireless network with a fourth network connection for coupling the second wireless device to the first wireless network,
    indicating to the first wireless network to couple with the second wireless device via the fourth network connection ,and
    indicating to the second wireless network to couple with the first wireless device via the second network connection.

2. The method of claim 1, wherein the executing the first vertical handover and the second vertical handover comprises executing the first vertical handover and the second vertical handover concurrently.

3. The method of claim 1, wherein the executing the first vertical handover and the second vertical handover is in accordance with one or more triggering events associated with at least one of a quality of service threshold, a wireless device user preference, an operation policy for one of the wireless networks, an operation policy for the core network, a radio resource management policy for one of the wireless networks, or a common radio resource management policy for the wireless networks.

4. The method of claim 1, wherein the executing the first vertical handover and the second vertical handover comprises:
    executing the first vertical handover and the second vertical handover based at least upon vertical handover information associated with a plurality of wireless devices;
    receiving the network information from the wireless networks, the network information including at least one of an operation policy for one of the wireless networks, a radio resource management policy for one of the wireless networks, or a quality of service requirement for one of the wireless networks;
    receiving the user information from the first wireless device and the second wireless device, the user information including at least one of a user preference for the first or second wireless device, a quality of service requirement for the first or second wireless device, or a type of service being used by the first or second wireless device; and
    storing, at least temporarily, the network information and the user information in the multiuser table.

5. The method of claim 4, further comprising:
    receiving the core information from one or more core networks coupled to one of the wireless networks, the core information including at least one of an operation policy for the one or more core networks, a common radio resource management policy, a quality of service requirement for the core network or a type of service supported by the core network; and
    storing, at least temporarily, the core information in the multiuser table.

6. The method of claim 1, wherein the executing the first vertical handover and the second vertical handover comprises:
    identifying the first wireless device as a first candidate to swap a first network connection coupling the first wireless device to a first wireless network with a second network connection to couple the first wireless device to a second wireless network;
    identifying the second wireless device as a second candidate to swap a third network connection coupling the second wireless device to the second wireless network with a fourth network connection to couple the second wireless device to the first wireless network;
    distributing information associated with the first candidate and the second candidate to the first wireless network and the second wireless network;
    receiving an approval of the first and second candidates from both the first and second wireless networks; and
    sending a confirmation to the first and second wireless networks, the confirmation including an indication that the first and second candidates have been approved by both the first and second wireless networks.

7. The method of claim 6, wherein the first and second candidates are identified for swapping based at least in part on a quality of service improvement for a network operating parameter associated with the first wireless network or the second wireless network.

8. The method of claim 6, further comprising:
    forwarding indications to the first wireless device to swap the first network connection with the second network connection and to the second wireless device to swap the third network connection with the fourth network connection, wherein the first wireless device and the second wireless device are configured to perform the respective swaps concurrently.

9. The method of claim 1,
    wherein the wireless networks include a first wireless network and a second wireless network;
    wherein the first wireless network includes a Wi-Fi type of wireless network; and
    wherein the second wireless network includes one of a WiMAX, 3GPP or 3GPP2 type of wireless network.

10. The method of claim 1,
    wherein the wireless networks include a first wireless network and a second wireless network;
    wherein the first wireless network includes a WiMAX type of wireless network; and
    wherein the second wireless network is a 3GPP type of wireless network.

11. The method of claim 1, wherein the executing the first vertical handover and the second vertical handover is in accordance with a triggering event associated with a wireless device user preference including a threshold security level.

12. The method of claim 1, wherein the executing the first vertical handover and the second vertical handover is in accordance with a triggering event associated with a quality of service threshold associated with a traffic class priority of a plurality of data types.

13. An apparatus configured for vertical handovers of wireless devices, comprising:
    a vertical handover manager configured to:
    determine candidates, including a first wireless device and a second wireless device, for vertical handovers between wireless networks;
    execute a first vertical handover of the first wireless device and a second vertical handover of the second wireless device; and
    maintain, with other multiple vertical handover managers collocated at respective access nodes, a multiuser table including network information and user information of the wireless networks, and core information from a core network that is separately coupled to the wireless networks,
    wherein the executing the first vertical handover and the second vertical handover comprises:
    swapping a first network connection coupling the first wireless device with a first wireless network with a second network connection to couple the first wireless device to a second wireless network,
    swapping a third network connection coupling the second wireless device with the second wireless network with a fourth network connection to couple the second wireless device with the first wireless network,
    indicating to the first wireless network to couple with the second wireless device via the fourth network connection, and
    indicating to the second wireless network to couple with the first wireless device via the second network connection.

14. The apparatus of claim 13, wherein the first vertical handover and the second vertical handover are executed concurrently.

15. The apparatus of claim 13, wherein the executing the first vertical handover and the second vertical handover is in accordance with one or more triggering events associated with one of a quality of service threshold, a wireless device user preference, an operation policy for one of the wireless networks, an operation policy for the core network, a radio resource management policy for one of the wireless networks, or a common radio resource management policy for the wireless networks.

16. A system configured to execute vertical handovers of wireless devices, comprising:
   a memory; and
   a vertical handover manager, coupled to the memory, configured to:
   determine candidates, including a first wireless device and a second wireless device, for vertical handovers between wireless networks;
   execute a first vertical handover of the first wireless device and a second vertical handover of the second wireless device; and
   maintain, by multiple vertical handover managers each collocated at a respective access node, a multiuser table including network information and user information of the wireless networks, and core information from a core network that is separately coupled to the wireless networks.

17. The system of claim 16, wherein the vertical handover manager is further configured to:
   receive network information from the wireless networks, the network information to include at least one of an operation policy for one of the wireless networks, a radio resource management policy for one of the wireless networks, or a quality of service requirement for one of the wireless networks;
   receive user information from both the first wireless device and the second wireless device, the user information to include at least one of a user preference for the first or second wireless device, a quality of service requirement for the first or second wireless device, or a type of service being used by the first or second wireless device; and
   store in the memory, at least temporarily, the network information and the user information in the multiuser table.

18. The system of claim 17, wherein the vertical handover manager is further configured to:
   receive core information from one or more core networks coupled to one of the wireless networks, the core information to include at least one of an operation policy for the one or more core networks, a common radio resource management policy, a quality of service requirement for the core network or a type of service supported by the core network; and
   store in the memory, at least temporarily, the core information in the multiuser table.

19. The system of claim 16, wherein the executing the first vertical handover and the second vertical handover comprises:
   identifying the first wireless device as a first candidate to swap a first network connection coupling the first wireless device to a first wireless network with a second network connection to couple the first wireless device to a second wireless network;
   identifying the second wireless device as a second candidate to swap a third network connection coupling the second wireless device to the second wireless network with a fourth network connection to couple the second wireless device to the first wireless network;
   distributing information associated with the first candidate and the second candidate to the first wireless network and the second wireless network;
   receiving an approval of the first and second candidates from both the first and second wireless networks; and
   sending a confirmation to the first and second wireless networks, the confirmation including an indication that the first and second candidates have been approved by both the first and second wireless networks.

20. The system of claim 19, wherein the identifying the first and second candidates is based on a quality of service improvement for a network operating parameter associated with the first wireless network or the second wireless network.

21. The system of claim 19, wherein the executing the first vertical handover and the second vertical handover comprises:
   forwarding indications to the first wireless device to swap the first network connection with the second network connection and to the second wireless device to swap the third network connection with the fourth network connection, wherein the first wireless device and the second wireless device are to perform respective swaps concurrently.

22. A non-transitory computer-readable medium storing executable instructions that, if executed, cause a computing component to perform operations comprising:
   determining candidates, including a first wireless device and a second wireless device, for vertical handovers between wireless networks;
   executing a first vertical handover of the first wireless device and a second vertical handover of the second wireless device; and
   maintaining, with other vertical handover managers collocated at respective access nodes, a multiuser table including network information and user information of the wireless networks, and core information from a core network that is separately coupled to the wireless networks,
   wherein the executing the first vertical handover and the second vertical handover comprises:
   swapping a first network connection coupling the first wireless device to a first wireless network with a second network connection to couple the first wireless device to a second wireless network,
   swapping a third network connection coupling the second wireless device to the second wireless network with a fourth network connection to couple the second wireless device to the first wireless network,
   indicating to the first wireless network to couple with the second wireless device via the fourth network connection, and
   indicating to the second wireless network to couple with the first wireless device via the second network connection.

23. The non-transitory computer-readable medium of claim 22, wherein the first vertical handover and the second vertical handover are executed concurrently.

24. The non-transitory computer-readable medium of claim 22, wherein the executing the first vertical handover and the second vertical handover is in accordance with one or more triggering events associated with one of a quality of service threshold, a wireless device user preference, an operation policy for one of the wireless networks, an operation policy for a core network coupled to one of the wireless networks, a radio resource management policy for one of the wireless networks or a common radio resource management policy for the wireless networks.

\* \* \* \* \*